US010294397B2

(12) United States Patent
Srivatsan et al.

(10) Patent No.: US 10,294,397 B2
(45) Date of Patent: May 21, 2019

(54) ADHESIVE COMPOUNDS

(75) Inventors: Nagarajan Srivatsan, Pasadena, CA (US); Prakash Mallya, Pasadena, CA (US); Daniel L. Holguin, Pasadena, CA (US); Dominique Wouters, Pasadena, CA (US); Eric L. Bartholomew, Pasadena, CA (US); Liza P. Lofton, Pasadena, CA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 12/704,942

(22) Filed: Feb. 12, 2010

(65) Prior Publication Data
US 2010/0266837 A1 Oct. 21, 2010

Related U.S. Application Data

(60) Provisional application No. 61/152,404, filed on Feb. 13, 2009.

(51) Int. Cl.
*C09J 123/02* (2006.01)
*B32B 5/18* (2006.01)
*C08K 5/00* (2006.01)
*C09J 151/06* (2006.01)
*B32B 27/06* (2006.01)
*B32B 27/18* (2006.01)
*B32B 27/30* (2006.01)
*B32B 27/32* (2006.01)
*B32B 27/34* (2006.01)
*B32B 27/40* (2006.01)
*C08L 23/18* (2006.01)
*C08L 91/00* (2006.01)

(52) U.S. Cl.
CPC .............. *C09J 123/02* (2013.01); *B32B 5/18* (2013.01); *B32B 27/065* (2013.01); *B32B 27/18* (2013.01); *B32B 27/306* (2013.01); *B32B 27/308* (2013.01); *B32B 27/32* (2013.01); *B32B 27/34* (2013.01); *B32B 27/40* (2013.01); *C08K 5/0091* (2013.01); *C09J 151/06* (2013.01); *B32B 2266/025* (2013.01); *B32B 2266/0221* (2013.01); *B32B 2266/0242* (2013.01); *B32B 2266/0278* (2013.01); *B32B 2307/50* (2013.01); *B32B 2307/712* (2013.01); *B32B 2405/00* (2013.01); *B32B 2605/00* (2013.01); *C08L 23/18* (2013.01); *C08L 91/00* (2013.01); *C08L 2666/04* (2013.01); *C08L 2666/24* (2013.01); *Y10T 428/249983* (2015.04)

(58) Field of Classification Search
None
See application file for complete search history.

(56) References Cited

U.S. PATENT DOCUMENTS

| | | | |
|---|---|---|---|
| 3,725,115 A * | 4/1973 | Christenson | C09J 5/06 442/151 |
| 3,786,116 A | 1/1974 | Milkovich et al. | |
| 4,243,500 A | 1/1981 | Glennon | |
| 4,418,120 A | 11/1983 | Kealy et al. | |
| 4,551,388 A | 11/1985 | Schlademan | |
| 4,554,324 A | 11/1985 | Husman et al. | |
| 4,693,935 A | 9/1987 | Mazurek | |
| 4,726,982 A | 2/1988 | Traynor et al. | |
| 4,732,808 A | 3/1988 | Krampe et al. | |
| 4,833,179 A | 5/1989 | Young et al. | |
| 4,851,278 A | 7/1989 | Enanoza | |
| 4,988,742 A | 1/1991 | Moon et al. | |
| 5,006,582 A | 4/1991 | Mancinelli | |
| 5,024,880 A | 6/1991 | Veasley et al. | |
| 5,028,484 A | 7/1991 | Martin et al. | |
| 5,057,366 A | 10/1991 | Husman et al. | |
| 5,143,972 A | 9/1992 | Groves | |
| 5,264,278 A * | 11/1993 | Mazurek et al. | 428/317.3 |
| 5,554,691 A * | 9/1996 | St. Clair | C08C 19/38 525/111 |
| 5,587,237 A | 12/1996 | Korpman et al. | |
| 5,625,005 A | 4/1997 | Mallya et al. | |
| 5,883,148 A * | 3/1999 | Lewandowski | C09J 4/06 522/95 |
| 6,197,149 B1 | 3/2001 | Hyde et al. | |
| 6,268,415 B1 * | 7/2001 | Renz | B32B 17/10761 524/91 |
| 6,441,114 B1 * | 8/2002 | Peloquin et al. | 526/307.2 |
| 6,565,969 B1 * | 5/2003 | Lamon et al. | 428/349 |
| 6,608,143 B1 * | 8/2003 | Fukuoka et al. | 525/309 |
| 6,642,298 B2 | 11/2003 | Foreman et al. | |
| 6,670,417 B2 | 12/2003 | Foreman et al. | |
| 2003/0022980 A1 | 1/2003 | Foreman et al. | |
| 2003/0166767 A1 | 9/2003 | Foreman et al. | |
| 2004/0220308 A1 * | 11/2004 | Paul | C09J 153/02 524/270 |
| 2004/0249046 A1 * | 12/2004 | Abhari | C09J 123/10 524/474 |

(Continued)

FOREIGN PATENT DOCUMENTS

| | | |
|---|---|---|
| CN | 1302837 | 7/2001 |
| EP | 0303430 | 2/1989 |

(Continued)

OTHER PUBLICATIONS

International Search Report and Written Opinion issued in corresponding International Application No. PCT/US2010/024048 dated May 3, 2010.

(Continued)

*Primary Examiner* — Chinessa T. Golden
(74) *Attorney, Agent, or Firm* — Avery Dennison Corporation

(57) ABSTRACT

The invention relates to multiphase compositions of matter comprising at least an acrylic phase and a hydrocarbon phase, and more specifically to pressure sensitive adhesive compositions of matter of an acrylic-hydrocarbon polymer and an additional hydrocarbon component which has a molecular weight of at least 1,000 and may include one or both of an oligomeric hydrocarbon and a polymeric hydrocarbon.

32 Claims, No Drawings

(56) References Cited

U.S. PATENT DOCUMENTS

| | | | |
|---|---|---|---|
| 2005/0256254 A1* | 11/2005 | Luhmann | C09J 153/02 |
| | | | 524/555 |
| 2007/0129498 A1* | 6/2007 | Curry | 525/242 |
| 2007/0207284 A1* | 9/2007 | McClintic | 428/40.1 |
| 2008/0113094 A1* | 5/2008 | Casper | 427/208.4 |
| 2008/0249221 A1* | 10/2008 | Corkery | B82Y 30/00 |
| | | | 524/404 |

FOREIGN PATENT DOCUMENTS

| | | | |
|---|---|---|---|
| EP | 0349216 | 1/1990 | |
| EP | 0352901 | 1/1990 | |
| GB | 2402394 | 12/2004 | |
| JP | 2937476 | 8/1999 | |
| JP | 2001-517725 | 10/2001 | |
| KR | 10-2004-0104552 | 12/2004 | |
| WO | WO 03083005 A1 * | 10/2003 | C09J 151/04 |

OTHER PUBLICATIONS

International Preliminary Report on Patentability issued in corresponding International Application No. PCT/US2010/024048 dated Aug. 25, 2011.

* cited by examiner

ADHESIVE COMPOUNDS

TECHNICAL FIELD

This disclosure relates to multiphase compositions of matter comprising at least an acrylic phase and a hydrocarbon phase, and more specifically to pressure sensitive adhesive compositions of matter of an acrylic-hydrocarbon polymer and an additional hydrocarbon component which has a molecular weight of at least 1,000 and may include one or both of an oligomeric hydrocarbon and a polymeric hydrocarbon.

BACKGROUND

Pressure sensitive adhesives ("PSAs"), as commonly understood in the art and used herein, are typically viscoelastic materials that adhere instantaneously to most substrates with the application of slight pressure and remain permanently tacky. PSAs are finding increasingly more challenging uses as they become stronger and easier to apply. Such PSAs have now found many uses in industrial applications and are increasingly being favored by automobile manufacturers for mounting various parts of an automobile, from dashboard parts to body panels.

Low surface energy ("LSE") materials such as polypropylene and steel coated with LSE paints are increasingly used in the manufacture of automobiles. LSE materials also are increasingly used in consumer electronic applications. In the automotive industry, for example, parts such as body side moldings and weather seal foams are bonded to the substrates, typically polypropylene and painted steel, through the use of such PSAs. Clearly, such applications require not just high cohesive strength but high adhesion to LSE/nonpolar surfaces as well as resistance to elevated temperatures and good ultraviolet ("UV") light resistance and aging properties.

Unfortunately, substrates composed of LSE materials such as polypropylene, polyethylene, and new-generation automotive paints and clear coats are extremely difficult to adhere to, particularly with PSAs. The main factors engendering this difficulty are the surface energies of the PSAs (such as acrylics), which are higher than those of the substrates (and thereby, the contact area between the PSAs and substrate surface is limited because the PSAs cannot readily wet the surface of the substrate), and a general lack of specific loci for covalent or strong non-covalent bonding (e.g., hydrogen or ionic bonding) on the surfaces, so that adhesion must occur primarily through the weaker van der Waals forces.

Common strategies used in the art to obtain satisfactory adhesion to LSE substrates include lowering the surface energies of the PSAs through appropriate choice of polymer composition or additives such tackifiers, decreasing the modulus of the composition through decreased crosslinking and/or heavy use of tackifiers, and changing the nature of the surface of the LSE substrates through use of relatively more polar primers. The first two strategies generally lead to unsatisfactory results because the cohesive strength of the PSAs typically suffers, i.e., decreases, due to both tackification and decreased crosslinking, and there is a progressively increasing market need for PSAs that simultaneously possess high cohesive strength and high adhesion. The last strategy can yield satisfactory results with respect to PSA performance, but requires additional primer coating and drying steps to be added to the process.

The use of macromers with PSAs and for other applications are known. Macromers are relatively low molecular weight polymers having a functional reactive group at one or more terminals of the polymer. Patents that disclose such PSAs include, and are all incorporated by reference herein in their entireties, the following U.S. Pat. Nos. 3,786,116, 4,551,388, 4,554,324, 4,693,935, 4,732,808, 4,833,179, 4,851,278, 5,006,582, and 5,057,366.

Another approach known in the art involves the tackification of acrylics to improve adhesion to low-energy surfaces such as polypropylene or polyethylene. Patents that disclose such PSAs include, and are all incorporated herein by reference in their entireties, the following U.S. Pat. Nos. 4,418,120, 4,726,982, 4,988,742, and 5,028,484, and European Publication No. 303430. All of these patents, incorporated herein by reference in their entireties, deal with tackification of the acrylic phase in order to improve adhesion properties. A number of these patents necessitate the use of a UV, on-web polymerization process. Because some use rosin ester type tackifiers, they would be expected to have poor UV and oxidative stability.

Yet another approach that is known in the art utilizes acrylic polymers and elastomers in two-phase systems, some of which claim improved adhesion to painted surfaces and low temperature performance. Representative patents include the following U.S. Pat. Nos. 4,243,500 and, 5,024,880, and European Publication Nos. 349216 and 352901, all of which are incorporated by reference herein in their entireties. These patents involve using a UV-polymerization process to obtain a two-phase network, as UV light is essential to achieve crosslinking between the acrylic and the unsaturation in the elastomer. Another representative patent is U.S. Pat. No. 5,143,972, which is incorporated by reference herein in its entirety.

Grafting a saturated hydrocarbon macromer onto an acrylic backbone will yield a two-phase compound consisting of a graft (or comb-type) copolymer evincing all of the desirable qualities mentioned above. These compounds are described in commonly owned U.S. Pat. No. 5,625,005, which is incorporated by reference herein in its entirety.

U.S. Pat. Nos. 6,670,417 and 6,642,298, which are incorporated by reference herein in their entireties, claim to improve upon the compounds disclosed in U.S. Pat. No. 5,625,005 ("the '005 patent") by providing further specific working examples within the framework set forth in the '005 patent.

Within the context of automobile manufacturing and similar applications, a particularly popular use of PSAs is for bonding of body side molding parts and weather seal rubbers to painted surfaces. The materials to be bonded, i.e., thermoplastic polyolefins ("TPOs"), rubbers and automotive paints, are LSE materials. PSAs used to bond these materials are therefore invariably tackified and/or plasticized. Tackifiers and plasticizers (modifiers) are, for the most part, low molecular weight materials that are not covalently bonded to the PSA polymer. The modifiers have a two fold beneficial impact on the PSA material characteristics because they increase the bond strength that can be obtained with the PSAs.

On one hand, the modifiers lower the surface energy of the PSAs so that the surface energies of the PSAs are better matched to those of the substrates. Such matching of the surface energies ensures that the PSAs will tend to spontaneously wet out the substrate, thereby increasing the contact area. The PSA performance modifiers invariably consist of materials with solubility parameters similar to those of the substrates. Because the substrates to be bonded consist of LSE materials such as TPOs and painted surfaces, the PSA modifiers consist for the most part of low-solubility parameter materials such as pure hydrocarbons and silicones. The modifiers also alter the rheological or viscoelastic characteristics of the PSAs. They decrease the modulus of the PSAs so the materials tend to flow better, thereby increasing contact area in a given amount of time, and they modulate the frequency positions where the PSAs can best dissipate the energy applied during debonding events.

In the context of foam constructions, use of PSA performance modifiers can have negative consequences, in the instances where the solubility parameters of the foam materials are similar to those of the PSA performance modifiers. The PSA additives tend to migrate into the foams because the tackifier and/or plasticizer molecules are not covalently bonded to the PSA, the modifiers possess relatively low molecular weights, and the modifiers possess solubility parameters similar to those of the foams. This migration has the following two negative consequences: it depletes the PSA of the performance-enhancing additives and alters the foam performance characteristics (i.e., it tackifies and/or plasticizes the foam). In addition, processing aids and foaming agents (blowing agents) are often used in the manufacture of foams. These are typically non-covalently bonded low molecular weight materials. In adhesive-foam-adhesive constructions, the processing aids and foaming agents can migrate from the foams into the adhesives where they can potentially induce deleterious changes of the adhesive characteristics by chemically modifying the materials or by blooming to the interface of the adhesive and the substrates and thereby forming weak boundary layers.

What is needed is further enhancement of the desirable properties evidenced by PSAs, including high cohesive strength and the ability to strongly bond to LSE surfaces such as polypropylene and automotive paints without the use of primers, and preferably with reduced costs. It is also highly desirable to eliminate or mitigate the migration of materials from adhesives into foams and vice versa. By doing so, stable, strong bonds can be obtained and maintained between the substrates and the adhesives. The embodiments of the present disclosure answer these and other needs.

SUMMARY

One embodiment of the present invention is a PSA that includes a graft copolymer and a second hydrocarbon compound. The graft copolymer is formed by reacting an acrylic monomer system including at least one alkyl acrylate ester containing from about 2 to about 20 carbon atoms in the alkyl group in the presence of a macromer that is ethylene butylene, ethylene propylene, isobutylene, or mixtures thereof. The second hydrocarbon compound has a molecular weight of at least 1,000 and can be, for example, an oligomeric hydrocarbon or a polymeric hydrocarbon, or a mixture thereof.

In a further embodiment, the PSA of the invention includes a tackifier compound that is miscible in at least a portion of the compound. Also, the PSA can further include a cross-linking agent. In addition, one or both of the macromer component of the graft copolymer and the second hydrocarbon compound can be hydrogenated.

In accordance with a further embodiment of the invention, either one or both of the graft copolymer and the second hydrocarbon compound are crystalline. Also, either one or both of the graft copolymer and the second hydrocarbon compound can contain reactive sites. In addition, the reaction sites can be carboxylic acid, hydroxyl, anhydride, aldehyde, ketone, acetate, amine, amide, aziridine, epoxide, mercapto, acrylate, methacrylate, vinyl, or mixtures thereof. Furthermore, the second hydrocarbon compound can be a polymeric compound made of monomers that are ethylene, propylene, butadiene, isoprene, isobutylene, hexene, octene, or mixtures thereof.

Another embodiment of the invention is a product that includes a layer of foam having two surfaces and at least one PSA composition. The PSA includes a graft copolymer and a second hydrocarbon compound as described above. The graft copolymer is formed by reacting an acrylic monomer system including at least one alkyl acrylate ester containing from about 2 to about 20 carbon atoms in the alkyl group in the presence of a macromer that is ethylene butylene, ethylene propylene, isobutylene, or mixtures thereof. The second hydrocarbon compound has a molecular weight of at least about 1,000. The PSA composition is applied to one or both surfaces of the layer of foam.

In another embodiment of the invention, more detailed features of the invention, the foam is made of polyolefins, copolymers of polyolefins with other monomers, copolymer of polyolefins with acrylics, copolymer of polyolefins with vinyl acetates, polyurethane, or acrylics. Also, the PSA product can further include a barrier layer disposed between the layer of foam and the compound. In addition, the barrier layer can include a polyurethane, poly(ethylene-co-acrylic acid), poly(ethylene-co-acrylic acid) metal salts, poly(ethylene-co-methacrylic acid), poly(ethylene-co-methacrylic acid) metal salts, poly(ethylene-co-methyl acrylate), poly(ethylene-co-vinyl acetate), poly(ethylene-co-vinyl acetate-co-carbon monoxide), poly(vinyl alcohol-co-ethylene), or poly(ethylene-co-acrylic acid). In addition, the foam can be made of polyolefins, copolymers of polyolefins with other monomers, copolymer of polyolefins with acrylics, copolymer of polyolefins with vinyl acetates, polyurethane, or acrylics.

In a further embodiment of the invention, the PSA of the invention further includes one or both of a tackifier compound that is miscible in at least a portion of the compound and a cross-linking agent. The barrier layer has solubility parameters that are higher than corresponding solubility parameters for the tackifier compound and the cross-linking agent.

In a further embodiment of the invention, the PSA of the invention is cured by ultraviolet radiation or electron beam radiation. Also, the PSA can be cured with a crosslinking agent.

A further embodiment of the invention includes a PSA according to the invention that includes an acrylic-hydrocarbon graft copolymer, and one or both of a hydrocarbon oligomer and a hydrocarbon polymer.

In a further embodiment of the invention, the acrylic-hydrocarbon graft copolymer includes an acrylic monomer copolymerized with a hydrocarbon macromonomer. The hydrocarbon macromonomer can be, for example, an olefin. In addition, the hydrocarbon macromonomer can range from about 1% to about 100% in saturation. In addition, the hydrocarbon macromonomer can range from about 1,000 to about 500,000 in molecular weight.

In a further embodiment of the invention, the hydrocarbon macromonomer can be, for example, ethylene-butylene, ethylene-propylene, ethylene-butylene-propylene, or isobutylene. The acrylic monomer can be, for example, 2-ethylhexyl acrylate, methyl acrylate, butyl acrylate, acrylic acid, 2-hydroxyethylacrylate, and rubber monomers. In addition, the hydrocarbon oligomer and the hydrocarbon polymer can be, for example, ethylene, propylene, butadiene, isoprene, isobutylene, hexene, octene, or mixtures thereof.

In a further embodiment of the invention, one or both of the hydrocarbon oligomer and the hydrocarbon polymer are hydrogenated. Also, either one or both of the hydrocarbon oligomer and the hydrocarbon polymer can be crystalline. In addition, either one or both of the hydrocarbon oligomer and the hydrocarbon polymer can contain reactive sites.

In a further embodiment of the invention, the reaction sites are carboxylic acid, hydroxyl, anhydride, aldehyde, ketone, acetate, amine, amide, aziridine, epoxide, mercapto, (meth)acrylate, vinyl, or mixtures thereof. Those reactive sites apply the same to the hydrocarbon macromer as well. Also, the hydrocarbon oligomer and the hydrocarbon polymer can be in one or more of an acrylic phase of the compound, a first hydrocarbon phase of the compound that contains the hydrocarbon macromonomer, and a second hydrocarbon phase of the compound that contains the hydrocarbon oligomer and the hydrocarbon polymer.

In a further embodiment of the invention, the PSA of the invention further includes a silicone phase. Also, the PSA of the invention can further include a high glass transition temperature material. This high glass transition temperature material can also be further cross-linked. In addition, the high glass transition temperature material can be, for example, polystyrene or poly methyl methacrylate.

Another embodiment of the invention includes a PSA that includes, by weight based on the weight of the composition, between about 35% and about 87.5% of a base adhesive comprised of about 55% 2-ethylhexyl acrylate, about 15% methyl acrylate, about 5% 2-methoxyethyl acrylate, and about 25% KRATON™ L1253 polyethylene/butene methacrylate; between about 5% and about 25% LIR-200™ hydrogenated poly isoprene; between about 7.5% and about 40% EASTOTAC™ H-100W resin; and between about 0.05% and about 0.1% PAPI 27 isocyanate.

These and other features and advantages will become further apparent from the detailed description and accompanying figures that follows.

DETAILED DESCRIPTION

One embodiment of the invention provides a multi-phase system or composition that includes at least a continuous, acrylic phase and a discontinuous, hydrocarbon phase that consists preferably of saturated or mostly saturated hydrocarbon macromers such as olefins. A key recognition of this embodiment is that the addition of hydrocarbon compounds, which preferably have a molecular weight of at least 1,000, to such multi-phase composition enhances their adhesion strength as well as, unexpectedly, their cohesive (i.e., internal) strength. The hydrocarbon compounds, can be added to the hydrocarbon phase of the multi-phase composition, the acrylic phase, to both the hydrocarbon and acrylic phase, or as a separate, additional hydrocarbon phase.

In further embodiments, the PSA disclosed herein can be prepared with additional phases, chosen to impart additional properties to the compound. For instance, a silicone phase can be added to enhance adhesion to silicone substrates. The hydrocarbon and acrylic phases can be chosen to form a graft copolymer that will support any number of phases desired to be contained in the PSA. It is understood that these phases can exhibit microphase separation.

In one embodiment, the adhesive polymers of the invention are rubber-acrylic hybrid polymers having an acrylic polymer backbone grafted with hydrocarbon macromers and further including hydrocarbon oligomers and/or hydrocarbon polymers. Hydrocarbon macromers that can be used include, but are not limited to, olefinic hydrocarbons such as ethylene-butylene macromers, ethylene-propylene macromers ethylene-butylene-propylene macromers, and isobutylene macromers, and can range in molecular weight from about 2,000 to about 30,000. Specific, commercially available examples of a hydrocarbon macromer that can be used is L-1253, a fully hydrogenated ethylene-butylene macromer with a molecular weight of approximately 6000 that is manufactured by Kuraray Co., Ltd. of Tokyo, Japan. Other non-olefinic macromers that can form a separate phase from the acrylic backbone also can be incorporated into the adhesive polymer, and include, but are not limited to, poly methyl methacrylate ("PMMA") available from Lucite International Ltd. of Southampton, United Kingdom; poly styrene ("PS") available from Bimax, Polymer Chemistry Innovations Inc. of Tucson, Ariz.; poly dimethylsiloxane ("PDMS"); poly ethyleneoxide ("PE OX"); and poly propyleneoxide ("PP OX"). Those macromers also can be added as an additional phase to the hydrocarbon macromers.

Typical rubber-acrylic hybrid polymers can be copolymers containing one or more of typical acrylic monomers such as 2-ethylhexyl acrylate ("EHA"), methyl acrylate ("MA"), butyl acrylate ("BA"), acrylic acid ("AA"), 2-hydroxyethylacrylate ("HEA"), etc. and rubber macromers. Workable compositions include EHA/HEA/L1253, EHA/AA/L1253, EHA/MA/HEA/L1253, BA/AA/L1253, EHA/MA/AA/L1253, BA/HEA/L1253, BA/MA/HEA/L1253, EHA/NVP (N-vinyl pyrrolidone)/AA/L1253, and BA/MA/AA/L1253. KRATON™ L1253 is a Polyethylene/butylene methacrylate available from Kraton Polymers LLC of Houston, Tex. Such polymers can be suitable for energy/radiation induced crosslinking by the addition of energy/radiation sensitive/reactive monomers but, as the skilled person will recognize, if high-energy electrons are used for crosslinking, the rubber-acrylic hybrid polymer need not necessarily contain any energy/radiation sensitive monomers as the possible compositions listed above may be suitable in and of themselves.

Hydrocarbon compounds that can be used in accordance with the invention include, but are not limited to, oligomers and hydrocarbon polymers. Such hydrocarbon compounds can be any preferably fully hydrogenated (but can range in hydrogenation from 0% to 100%) polymer compatible with the hydrocarbon macromers and preferably having a molecular weight of 1,000 or higher. In additional embodiments, hydrocarbon oligomers and hydrocarbon polymers that can be used to add to the hydrocarbon phase of the PSA can be crystalline in nature, and/or further contain reactive sites. The reaction sites can consist of, but are not limited to, carboxylic acid, hydroxyl, anhydride, aldehyde, ketone, acetate, amine, amide, aziridine, epoxide, mercapto, (meth) acrylate, vinyl, and mixtures thereof. Illustrative, non-limiting examples of such hydrocarbon oligomers and hydrocarbon polymers include, but are not limited to, ethylene, propylene, butadiene, isoprene, isobutylene, hexene, octene, the like, and mixtures thereof.

Commercially available examples of hydrocarbon compounds include oligomers and hydrocarbon polymers, such as LIR-200 and LIR-290 manufactured by Kuraray Co., Ltd., and UC203, a methacrylic functionlized liquid isoprene rubber that can be UV light or peroxide cured, also available from Kuraray Co., Ltd.; EXXELOR VA1201, EXXELOR VA1202, EXXELOR VA1801, EXXELOR VA1803, EXXELOR VA1840, EXXELOR VA1850 (maleic anhydride functionalized elastomeric ethylene copolymers), EXXELOR PO 1015, EXXELOR PO 1020 (maleic anhydride functionalized polypropylenes), and EXXELOR PE 1040 (maleic anhydride functionalized polyethylenes) available from ExxonMobil Chemical Corporation of Irving, Tex.; KRATON D series such as KRATON D-1101K(SBS) and KRATON D-1107 (SIS), KRATON G series, for example, KRATON G-1657M (SEBS) and KRATON G-1730M (SEPS), KRATON FG series such as KRATON FG-1901, KRATON IR, for example, KRATON IR-305 (IR) available from Kraton Polymers LLC of Houston, Tex.; and POLY BD series such as POLY BD 45 CT (carboxyl-terminated polybutadiene), POLY BD 600E (epoxidized hydroxyl terminated polybutadiene resin), POLY BD R4HTLO (hydroxy terminated polybutadiene resin), POLY BD LF-2 (hydroxyl terminated 1,3-butadiene homopolymer), POLY BD R45VT (vinyl functional polybutadiene) available from Sartomer Company, Inc of Exton, Pa.

Such rubber-acrylic hybrid polymers can be made by copolymerizing the hydrocarbon monomers such as alkyl acrylate ester monomers in the presence of a macromer containing a reactive acrylic or methacrylic end group and adding selected hydrocarbon compounds having a molecular weight of at least 1,000. Alternatively, an acrylic backbone can be produced with pendant functional groups capable of reacting with the end group of a macromer not having an acrylic or (meth)acrylic group, for instance, an acrylic backbone with anhydride groups and an ethylene butylene monool containing one terminal hydroxyl group. These additional hydrocarbon compounds may be added via any one of several methods that are known in the art, examples of which include, but are not limited to, solvent blending, hot-melt extrusion, reactive extrusion, or polymerizing in the presence of the additional hydrocarbon compounds.

It must be understood that the present invention is in no way limited by the method utilized to prepare the PSA, and any and all practicable processes, including but not limited to solvent polymerization, bulk flow through an extruder, syrup polymerization, and on-web energy curing, are contemplated as within the scope of this invention. Solely for purposes of discussion, a specific example of preparing a PSA according to the invention is described elsewhere below, but it is understood that the skilled reader will encounter no difficulty or need for undue experimentation to modify this or other methods to prepare PSA's within the ranges and bounds disclosed herein.

The total weight percent of the hydrocarbons (monomers, oligomers, and polymers) in the PSA's contemplated herein will preferably range from about 5% to about 75%. In one embodiment, the ratio of hydrocarbon monomer to hydrocarbon oligomers and polymers will preferably range from 1:100 to 100:1.

The acrylic monomer system used to make the acrylic background can be based solely on acrylate ester monomers, but also can be modified by inclusion of polar monomers. The acrylic-based backbone polymers are formed in the presence of the reactive hydrogenated macromer provided in a weight of about 5 to about 50, but preferably 10 to 30, and more preferably 15 to 25 percent by weight of the monomers forming the acrylic backbone and the macromer. The acrylic polymers that are used to form the backbone of the instant invention are preferably acrylic ester/acrylic acid copolymers, but can be formed from a variety of other monomers.

The acrylic-based backbone polymers to which the hydrocarbon macromer is grafted can contain from about 35 to about 100 weight percent of the total acrylate backbone one or more alkyl acrylate esters containing about 4 to about 8 carbon atoms in the alkyl group. Useful alkyl acrylate esters include n-butyl acrylate, 2-ethyl hexyl acrylate, isooctyl acrylate, and the like, with 2-ethyl hexyl acrylate being preferred.

A modifying monomeric component that also can be added includes one or more vinyl esters that can be present in a total amount of up to about 35 weight percent, based on total weight of the monomers forming the acrylate polymer backbone. Representatives of the vinyl esters that can be used include vinyl acetate, vinyl butyrate, vinyl propionate, vinyl isobutyrate, vinyl valerate, vinyl versitate, and the like.

Further modifying components of the acrylic backbone polymer that can be used are one or more diesters of a dicarboxylic acid and mixtures thereof, present in a total amount of up to about 35 weight percent based on the total weight of the monomers. Each ester group of the diester of the dicarboxylic acid independently contains from about 8 to about 16, and preferably from about 8 to about 12, carbon atoms. Preferred diesters include di-2-ethyl hexyl maleate, di-3-ethyl hexyl fumarate and mixtures thereof.

Yet other modifying components and preferably used monomers are one or more unsaturated carboxylic acids containing from about 3 to about 5 carbon atoms and present in a total amount of up to about 10 weight percent of the polymer, but preferably from about 5 to about 10 weight percent. Such unsaturated carboxylic acids include, among others, acrylic acid, methacrylic acid, itaconic acid, and the like, and mixtures thereof.

Other comonomers such as methyl acrylate, methyl methacrylate, styrene and the like also can be used to modify the Tg of the acrylic copolymer. Polar comonomers such as N-vinyl pyrrolidone, N-vinyl caprolactam, hydroxyethyl (propyl) (meth)acrylate, acetoacetoxyethyl methacrylate, etc. can be used to further enhance adhesion to various surfaces. Other comonomers such as glycidyl methacrylate or allyl glycidyl ether can be used to further enhance high-temperature shear properties. Presently preferred acrylic backbone polymers are copolymers of 2-ethyl hexyl acrylate present in an amount of from about 95 percent to about 90 weight percent, and acrylic acid present in an amount of from about 5 to about 10 weight percent.

The PSA's disclosed herein may further be subjected to crosslinking, which can be achieved through chemical means or energy/radiation curing. The choice of a chemical crosslinker depends on the chemical nature of the crosslinkable moiety introduced into the acrylic segment of the rubber-acrylic hybrid polymer. Exemplary chemical crosslinkers that can be employed include di-, tri-, or poly-isocyanates (such as PAPI or VORONATE available from Dow Chemical Company of Midland, Mich.) with or without a catalyst (such as dibutyltin dilaureate); ionic crosslinkers (such as TYZOR GBA available from E.I. du Pont de Nemours & Co., Inc. of Wilmington, Del., AAA available from NOAH Technologies of San Antonio, Tex.); di-, tri-, or poly-isocyanates (PAPI or VORONATE for example) with or without a catalyst (such as dibutyltin dilaureate); and di-, tri-, or poly-functional aziridines (such as DYNAMAR HX-752 offered by 3M of St. Paul, Minn.). The first three crosslinkers are believed to be most suitable if HEA is used as the crosslinkable acrylic moiety, and all crosslinkers can be used when AA is used as the crosslinkable acrylic moiety. Other novel chemical crosslinkers can be employed as well where the hydrocarbon macromer and the hydrocarbon oligomers and/or polymers of the PSA can be crosslinked. Illustrative, non-limiting examples of commercially available chemical crosslinkers include AAA TYZOR, XAMA available from Bayer of Pittsburgh, Pa., and PAPI and Voronate, available from Dow Chemical Company.

Energy/radiation induced crosslinking presents a versatile and attractive alternative to the aforementioned chemical crosslinking processes, particularly in situations where the PSA is coated as a hot melt. Suitable energy/radiation include application of UV light and high-energy electrons ("EB"). When applying UV light, the rubber-acrylic hybrid polymer must preferably include, i.e., be copolymerized with, UV sensitive/reactive moieties. These moieties can be present to the extent of 0.1%-10% by weight of the total monomer content. The PSA can contain multi-functional monomers such as hexanediol diacrylate, etc., to facilitate crosslinking. These multi-functional monomers can be present to the extent of 0%-5% by weight of the composition.

When applying EB for crosslinking, the rubber-acrylic hybrid polymer can include, i.e., be copolymerized with, EB sensitive/reactive moieties. These moieties can be present to the extent of 0.1%-10% by weight of the total monomer content. The PSA can contain multi-functional monomers such as hexanediol diacrylate, etc., to facilitate crosslinking. These multi-functional monomers can be present to the extent of 0%-5% by weight of the composition. The EB crosslinkable compositions do not need to include either the copolymerized EB sensitive moiety nor the multifunctional crosslinking agents.

In further embodiments, the macromer portion of the graft copolymer can be tackified using preferably tackifiers that are compatible with the hydrocarbon phase and incompatible with the acrylic phase of the compound. Preferably the tackifiers used are substantially fully saturated tackifiers. Specific tackifiers that can be employed in the practice of the invention include, but are not limited to, hydrogenated styrene-based resins such as REGALREZ™ resins designated as 1018, 1033, 1065, 1078, 1094 and 1126 manufactured and sold by Hercules, Inc. of Wilmington, Del.; REGALREZ™ 6108, a 60% hydrogenated aromatic resin also manufactured by Hercules; hydrogenated $C_5$ and/or $C_9$ hydrocarbon resin feed stocks such as ARKON™ P-70, P-90, P-100, P-115, M-90, M-100, M-110 and M-120 resins manufactured and sold by Arakawa Chemical Industries, Ltd of Osaka, Japan, and REGALITE™ R-100, R-1125, MGB-63, MGB-67, MGB-70 resins manufactured and sold by Hercules, Inc.; hydrogenated polycyclo-pentadienes such as ESCOREZ™ 5320, 5300, 5380 and 54000 resins manufactured and sold by ExxonMobil Chemical Corporation of Irving, Tex.; hydrogenated polyterpene and other naturally occurring resins such as CLEARON™ P-105, P-115, P-125, M-105, M-115 manufactured and sold by Yasuhara Yushi Kogyo Co. Ltd. of Hiroshima, Japan, and EASTOTACK™ H-100, H-100W, H-115, H-130 resins and the like manufactured and sold by Eastman Chemical Company of Kingsport, Tenn.; and KAYDOL™ hydrogenated mineral oil manufactured and sold by Witco Chemical Corp. of Cranford, N.J., and the like. The PSA compounds disclosed herein can contain between 5% and 50% by weight tackifiers.

For purposes of discussion only, and without limitation to be inferred therefrom, a few specific PSA's that can be prepared in accordance with the present invention include:

Example 1

A base acrylic ethylene butylene hybrid base polymer, as described elsewhere herein, was charged in a blending vessel with an agitator. The acrylic ethylene butylene hybrid base polymer contained L-1253. Under agitation, a 70% solution of LIR-200 in toluene was gradually added to the adhesive blend. The adhesive mixture was continuously agitated until the mixture was homogeneous, or for a minimum of 20 minutes.

Example 2

A graft copolymer was formed by reacting an acrylic monomer system comprising at least one alkyl acrylate ester containing from about 2 to about 20 carbon atoms in the alkyl group in the presence of a macromer selected from the group consisting of ethylene butylene, ethylene propylene, and mixtures thereof. A second hydrocarbon polymer having a molecular weight of at least 1,000 was then gradually blended in with the graft copolymer mixture. The adhesive mixture was continuously agitated until the mixture was homogeneous, or for a minimum of 20 minutes.

As mentioned elsewhere, tackifiers and/or crosslinking agents also can be added to the adhesive mixtures obtained in Examples 1 and 2.

For purposes of illustration only, five other specific, non-limiting, exemplary embodiments that can be prepared by a traditional solvent acrylic polymerization process are given in Examples 3-7 below.

Example 3

62% 2-Ethyl Hexyl Acrylate, 20% L-1253, Methacrylate function Ethylene Butylene macromer, 16% Methyl Acrylate and 2% Acrylic Acid+25% hydrocarbon tackifing resin based on solid polymer and +0.15% Aluminum Acetyl Acetonate (cross-linker).

Example 4

62% 2-Ethyl Hexyl Acrylate, 20% L-1253, Methacrylate function Ethylene Butylene macromer, 16% Methyl Acrylate and 2% Acrylic Acid+5% liquid isoprene rubber ("LIR") 200 hydrogenated poly Isoprene (25K mw), +25% hydrocarbon tackifing resin based on solid polymer, and +0.15% Aluminum Acetyl Acetonate (cross-linker).

Example 5

67.5% 2-Ethyl Hexyl Acrylate, 15% L-1253, Methacrylate function Ethylene Butylene macromer, 15.5% Methyl Acrylate and 2% Acrylic Acid+10% LIR 200 hydrogenated poly Isoprene (25K mw), +25% based on solid polymer, hydrocarbon tackifing resin, and +0.15% Aluminum Acetyl Acetonate (cross-linker).

Example 6

71.5% 2-Ethyl Hexyl Acrylate, 10% L-1253, Methacrylate function Ethylene Butylene macromer, 16.5% Methyl Acrylate and 2% Acrylic Acid+15% LIR 200 hydrogenated poly Isoprene (25K mw), +25% based on solid polymer, hydrocarbon tackifing resin, and +0.15% Aluminum Acetyl Acetonate (cross-linker).

Example 7

75.5% 2-Ethyl Hexyl Acrylate, 5% L-1253, Methacrylate function Ethylene Butylene macromer, 17.5% Methyl Acrylate and 2% Acrylic Acid+20% LIR 200 hydrogenated poly Isoprene (25K mw), +25% based on solid polymer, hydrocarbon tackifing resin, and +0.15% Aluminum Acetyl Acetonate (cross-linker).

In a further example, a PSA in accordance with the present disclosure was prepared from a mixture of a copolymer adhesive of 55% EHA, 15% MA, 5% MEAHEA, and 25% L1253, as disclosed in U.S. Pat. No. 5,625,005 (30-39.1 wt % solid), diluted in toluene, and then formulated with LIR 200, EASTOTAC H-100W from Eastman Chemical Company and PAPI 27 from Dow Chemical Company. The performance of this PSA on various substrates and for various dwell times was then measured against a control sample of the same copolymer adhesive formulated with REGALITE R1125 and PAPI 27. The precise formulations are listed in Table I below.

TABLE I

Adhesive compound formulations

|  | Ingredient | Weight (g) |
|---|---|---|
| Control Composition | Copolymer adhesive | 44.8 |
|  | REGALITE R1125 | 15.0 |
|  | PAPI 27 | 0.06 |
| Inventive PSA | Copolymer adhesive | 60.0 |
|  | LIR 200 | 15.0 |
|  | EASTOTAC H-100W | 45.0 |
|  | PAPI 27 | 0.09 |

The Shear Adhesion Failure Temperature ("SAFT") for both the inventive PSA and the control compound was determined by first bonding one inch by one inch PSA onto a one inch by two inch 2 mil aluminum foil along one side the aluminum foil. The one inch square of the PSA on the aluminum foil side was then bonded with a two inch by three inch stainless steel panel. A hole with a heavy duty hole puncher was made through the non-PSA covered aluminum foil, and the sample was then put inside a roll-down machine using a 4.5 lbs roller twice. Next, the sample was next heated in the oven for 30 minutes at a temperature of 70° C. Then, the sample was stored at room temperature for 24 hours and hung with a 1 Kg weight in the slot of a shear tester.

The glass transition temperature ("Tg") was measured using a TA Instrument's (of New Castle, Del.) differential scanning calorimeter ("DSC") Q2000. An approximately 5 mg sample was heated from −100° C. to 100° C. at a 50° C./min rate under 0.796° C./min modulation. The Tg was analyzed based on the reversible heat flow exhibited.

The samples were subjected to a room temperature shear test. Shear strength is a measure of the cohesiveness or internal strength of the adhesive. Shear was determined using a Pressure-Sensitive Tape Council (PSTC) test method, with a static load of 500 g and sample-on-panel overlap dimensions of ½ inch×½ inch. Tests were performed on panels inclined 2° from vertical. The samples were cut into 12 mm×51 mm test strips, which were then applied to brightly annealed, highly polished stainless steel test panels having a typical size of about 50 mm×75 mm, making a sample overlay of 12 mm×12 mm with the test panel. The sample portion on the test panel was rolled on using a 2 kg, 5.45 pli 65 shore "A" rubber-faced roller, rolling back and forth once at a rate of 30 cm/min. After a dwell time of at least 15 minutes under standard laboratory testing conditions, the test panels with the test strips were placed at a 2° angle from the vertical, and a load of 500 g was attached to the end of the test strips. The time (in minutes) for the test sample to fail cohesively was measured by a timer.

Furthermore, 90° and 180° peel adhesion tests were performed. The 90° Peel Adhesion test was performed with a tensile testing machine of the load cell or pendulum type on the following substrates: Carbamic painted ("CPP"), Stainless steel ("SS"), and Polypropylene ("PP") panels, after a dwell time of 20 minutes and 24 hours. A strip of 2 mil thick aluminum foil that is 1 inch by 6 inch along the machine direction was positioned on a selected substrate. Pressure was applied to the aluminum by rolling with a 2 kg roller. After dwelling on the substrate for the selected time at room temperature, the sample was removed by pulling the aluminum film strip at 90° to the adhesive surface at a speed of 30.5 cm/minute, noting the average adhesion in N/in width. For 80° C. or higher temperatures, the test was conducted using an Instron 5565 (of Norwood, Mass.) with a duration of 15 minutes per sample testing. The 180° Peel Adhesion test was performed in the same manner, with the sample removed by pulling the aluminum film strip at 180° to the adhesive surface at a speed of 5.1 mm/second. The performance results of the PSA and the control sample are listed in the below tables.

TABLE II

Polypropylene substrate

| | Dwell time/peel angle | | | |
|---|---|---|---|---|
| Unit | 20 mins/ 90° lb/in | 20 mins/ 180° lb/in | 24 hours/ 90° lb/in | 24 hours/ 180° lb/in |
| Control | 4.59 | 5.19 | 4.9 | 5.62 |
| Sample 1 | 5.5 | 5.42 | 6.6 | 5.83 |

TABLE III

Carbamic painted substrate

| | Dwell time/peel angle | | | |
|---|---|---|---|---|
| Unit | 20 mins/ 90° lb/in | 20 mins/ 180° lb/in | 24 hours/ 90° lb/in | 24 hours/ 180° lb/in |
| Control | 3.13 | 3.92 | 3.62 | 4.4 |
| Sample 1 | 3.97 | 5.01 | 5.13 | 5.22 |

TABLE IV

Stainless steel substrate

| | Dwell time/peel angle | | | | | |
|---|---|---|---|---|---|---|
| Unit | 20 mins/90° lb/in | 20 mins/180° lb/in | 24 hours/90° lb/in | 24 hours/ 180° lb/in | 80° C./90° lb/in | 80° C./ 180° lb/in |
| Control | 4.03 | 4.71 | 4.75 | 5.77 | 1.1 | 1.1 |
| Sample 1 | 5.27 | 5.72 | 7.23 | 5.95 | 1.13 | 0.97 |

TABLE V

Test Data

| | Control | Sample 1 |
|---|---|---|
| Coat weight (g/m$^2$) | 60.02 | 60.1 |
| SAFT (C. °) | 200+ | 200+ |
| Room temp, shear (minutes) | 10,000+ | 10,000+ |
| Tg (C. °) | −42 | −41 |

As previously mentioned, embodiments of the PSA's disclosed herein can be prepared with additional phases beyond the acrylic and hydrocarbon phases of the graft copolymer and/or hydrocarbon oligomer and polymer phases. As noted, a silicone phase can be added to enhance adhesion to silicone substrates. This silicone phase could be further tackified with MQ resins, which are good tackifiers for this phase. This silicone phase can be further cross-linked. Illustrative, non-limiting examples of silicone macromers (mono-functional low molecular weight oligomers) that can be used are available from Shin-Etsu Chemical Co., Ltd. of Tokyo, Japan, as well as United Chemical Technologies Inc. of Horsham, Pa. Suitable materials from Shin-Etsu Chemical Co., Ltd. are described as reactive, single-end type, modified silicone fluids and include X-24-8201, X-22-174DX, and X-22-2426, all of which contain a single methacrylate end-group and can be copolymerized in acrylic free-radical reactions. It is further envisioned in the present disclosure that other functional groups such as hydroxy or epoxy can be grafted onto the graft copolymer. Suitable materials from United Chemical Technologies Inc. are described as functionally terminated polydimethylsiloxanes. One particular suitable example is PS-560, which contains a methacrylate end group for copolymerization.

In further embodiments, PSA's, as disclosed herein, beneficially can be integrated with foams suitable for use in, for example, the automotive industry for the bonding of body side molding parts and weather seal rubbers to painted surfaces. As well know, such foams typically are prepared in the form of sheets or tapes for ease of application. Optionally, such foams can be barrier coated. The body side moldings of automobiles usually are constructed of thermoplastic polyolefins ("TPOs"), such as polypropylene ("PP"), and the weather seal strips are typically formed from ethylene propylene diene monomer ("EPDM") rubber-type materials. Such products can include tackified and/or plasticized PSA's applied to one or both sides of a foam covered by a barrier that prevents non-covalently bonded materials from migrating from the PSAs into the foam and from the foam into the PSAs. The foam also can also have a non-tackified and non-plasticized PSA disposed on one or both sides without a barrier therebetween, or alternatively can have a heat-activated adhesive disposed on one side. Suitable foams include those consisting of polyethylene, poly(ethylene-co-vinylacetate), polyolefins, copolymers of polyolefins with other monomers, copolymer of polyolefins with acrylics, copolymer of polyolefins with vinyl acetates, polyurethane, and acrylics, and are manufactured, for example, by Sekisui Voltek, LLC of Lawrence, Mass.

A known problem arises in that barrier layers currently in use consist of materials that are in general not very compatible with the tackifiers and/or plasticizers commonly found in PSAs. Because the tackifiers and plasticizers of interest possess low-solubility parameters, and it is desired that the PSAs should form a good bond to the barrier layer, appropriate barrier layers would consist of materials whose solubility parameters are higher than those of the PSA additives. Suitable barrier layer materials include polyurethane, poly(ethylene-co-acrylic acid), poly(ethylene-co-acrylic acid) metal salts (for example, zinc salts), poly(ethylene-co-methacrylic acid), poly(ethylene-co-methacrylic acid) metal salts (for example, zinc salts), and poly(ethylene-co-methyl acrylate), poly(ethylene-co-vinyl acetate), poly(ethylene-co-vinyl acetate-co-carbon monoxide) and poly(vinyl alcohol-co-ethylene), poly(ethylene-co-acrylic acid) and their salts, which are commercially available under the trade name SURLYN from E.I. du Pont de Nemours & Co., Inc.

A further beneficial use of the PSA's disclosed herein may be found together with decorative sheets formed of vinyl films plasticized with plasticizers. Such vinyl films, and particularly polyvinyl chloride (PVC) films, have earned wide acceptance over the years for outdoor applications (most typically in graphic media and advertising) because they are inexpensive and weather-resistant. The use of self-adhesive graphic films has many advantages over direct painting, including a wide range of operating conditions and better image quality and consistency due to the use of digital printers. When such films are used in the application of large format graphics onto commercial vehicles or vans with deep/corrugated body panels, the films must conform and adhere to various imperfections. Furthermore, the latest automotive paints tend to be low-energy surfaces that, as mentioned elsewhere herein, are difficult to adhere to with conventional acrylic PSAs. The PSA's disclosed herein can therefore be used to bond such vinyl films to a wider range of surfaces because they are particularly well suited for adhering to low surface energy surfaces such as automotive paint. Furthermore, the PSA's, as disclosed herein, also can be used on transfer tapes, double-sided tapes, labels, graphic films, and other applications that utilizes pressure sensitive adhesives.

An additional benefit realized by the present invention is that the overall weight percent of hydrocarbon monomers in a PSA decreases as the amount of additional hydrocarbon compounds, such as oligomers and polymers, that are added increases. This has a beneficial financial effect because hydrocarbon monomers such as ethylene butylene and ethylene propylene monomers are currently more expensive than hydrocarbon oligomers and polymers such as the aforementioned LIR-200 and other similar olefin materials, and thus by adding hydrocarbon oligomers and polymers to the compound, the overall price of the compound per unit of weight is reduced.

It must be specifically noted that the multi-phase compounds discussed hereinabove are provided as non-limiting examples only, and that the bounds and scope of the present invention extend to multi-phase as well as mono-phase systems and compounds.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments, which may have included tolerances, feature dimensions, specific operating conditions, engineering specifications, or the like, and which may vary between implementations or with changes to the state of the art, and no limitation should be implied therefrom. Applicants have made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . ."

What is claimed is:

1. A pressure-sensitive adhesive composition comprising:
   a hybrid acrylic-rubber graft copolymer formed by reacting an acrylic monomer system comprising at least one alkyl acrylate ester containing from about 2 to about 20 carbon atoms in the alkyl group in the presence of a macromer selected from ethylene-butylene macromers, ethylene-propylene macromers, ethylene-butylene-propylene macromers, isobutylene macromers, and mixtures thereof, the graft copolymer including a continuous acrylic phase and a discontinuous hydrocarbon phase;
   an additional hydrocarbon compound having a molecular weight of at least 1,000 and compatible with the macromer, the additional hydrocarbon compound is an oligomeric hydrocarbon or polymeric hydrocarbon or a combination of both,
   wherein the macromer is present in an amount of from 5% to about 50% by weight of the acrylic monomer system and the macromer,
   wherein the additional hydrocarbon comprises from about 5% to about 75% of the total weight of the pressure-sensitive adhesive composition, and
   wherein the additional hydrocarbon compound comprises a material selected from the group consisting of hydrogenated liquid polyisoprene, methacrylic functionalized liquid isoprene rubber, maleic anhydride functionalized polypropylenes, carboxyl-terminated polybutadiene, epoxidized hydroxyl terminated polybutadiene resin, hydroxy terminated polybutadiene resin, hydroxyl terminated 1,3-butadiene homopolymer, vinyl functional polybutadiene, and combinations thereof.

2. The pressure-sensitive adhesive of claim 1, further comprising a cross-linking agent.

3. The pressure-sensitive adhesive of claim 1, wherein both of the macromer component of the graft copolymer and the hydrocarbon compound are hydrogenated.

4. The pressure-sensitive adhesive of claim 1, wherein either one or both of the graft copolymer and the hydrocarbon compound are crystalline.

5. The pressure-sensitive adhesive of claim 1, wherein either one or both of the graft copolymer and the hydrocarbon compound contain reactive sites.

6. The pressure-sensitive adhesive of claim 5, wherein the reactive sites are selected from carboxylic acid, hydroxyl, anhydride, aldehyde, ketone, acetate, amine, amide, aziridine, epoxide, mercapto, acrylate, methacrylate, vinyl, and mixtures thereof.

7. The pressure-sensitive adhesive of claim 1, wherein the hydrocarbon compound is made of monomers selected from ethylene, propylene, butadiene, isoprene, isobutylene, hexene, octene, and mixtures thereof.

8. A product comprising:
   a layer of foam having two surfaces; and
   a pressure-sensitive adhesive composition according to claim 1,
   wherein the pressure-sensitive adhesive is applied to one or both surfaces of the layer of foam.

9. The product of claim 8, wherein the foam is made of a material selected from polyolefins, copolymers of polyolefins with other monomers, copolymer of polyolefins with acrylics, copolymer of polyolefins with vinyl acetates, polyurethane, and acrylics.

10. The product of claim 8, further comprising a barrier layer disposed between the layer of foam and the pressure-sensitive adhesive composition.

11. The product of claim 10, wherein the barrier layer includes a material selected from polyurethane, poly(ethylene-co-acrylic acid), poly(ethylene-co-acrylic acid) metal salts, poly(ethylene-co-methacrylic acid), poly(ethylene-co-methacrylic acid) metal salts, poly(ethylene-co-methyl acrylate), poly(ethylene-co-vinyl acetate), poly(ethylene-co-vinyl acetate-co-carbon monoxide), poly(vinyl alcohol-co-ethylene), and poly(ethylene-co-acrylic acid).

12. The product of claim 10, wherein:
   the pressure-sensitive adhesive further includes a cross-linking agent; and
   the barrier layer has solubility parameters that are higher than corresponding solubility parameters for the tackifier compound and the cross-linking agent.

13. The pressure-sensitive adhesive of claim 1, wherein the pressure-sensitive adhesive is further cured by radiation selected from ultraviolet radiation and electron beam radiation or by incorporation of a cross-linking agent.

14. The pressure-sensitive adhesive of claim 1, wherein the hydrocarbon oligomer and the hydrocarbon polymer are in one or more of an acrylic phase of the compound, a first hydrocarbon phase of the compound that contains a hydrocarbon macromonomer, and a second hydrocarbon phase of the compound that contains the hydrocarbon oligomer and the hydrocarbon polymer.

15. The pressure-sensitive adhesive of claim 14, further comprising a silicone phase.

16. The pressure-sensitive adhesive of claim 14, further comprising a high glass transition temperature material.

17. The pressure-sensitive adhesive of claim 16, wherein the high glass transition temperature material is selected from polystyrene and poly methyl methacrylate.

18. The pressure-sensitive adhesive of claim 1, further comprising a tackifier compound compatible with the hydrocarbon phase and incompatible with the acrylic phase.

19. The pressure-sensitive adhesive of claim 1, further comprising a tackifier compound that is miscible in at least a portion of the composition.

20. The pressure-sensitive adhesive of claim 1, wherein the acrylic monomer system is formed from about 35% to 100% total weight of the at least one alkyl acrylate ester containing from about 4 to about 8 carbon atoms in the alkyl group.

21. The pressure-sensitive adhesive of claim 20, further comprising a tackifier compound compatible with the hydrocarbon phase and incompatible with the acrylic phase.

22. The pressure-sensitive adhesive of claim 20, further comprising a tackifier compound that is miscible in at least a portion of the composition.

23. The pressure-sensitive adhesive of claim 20, wherein the acrylic monomer system comprises from about 95% to about 90% by weight 2-ethyl hexyl acrylate and from about 5% to about 10% by weight acrylic acid.

24. The pressure-sensitive adhesive of claim 1, wherein the acrylic monomer system comprises from about 95% to about 90% by weight 2-ethyl hexyl acrylate and from about 5% to about 10% by weight acrylic acid.

25. The pressure-sensitive adhesive of claim 1, wherein the additional hydrocarbon compound is fully hydrogenated.

26. The pressure-sensitive adhesive of claim 1, wherein the additional hydrocarbon compound is hydrogenated liquid polyisoprene or methacrylic functionalized liquid isoprene rubber.

27. The pressure-sensitive adhesive of claim 1, wherein the additional hydrocarbon compound is maleic anhydride functionalized polypropylene.

28. The pressure-sensitive adhesive of claim 1, wherein the additional hydrocarbon compound is carboxyl-terminated polybutadiene or epoxidized hydroxyl terminated polybutadiene resin.

29. The pressure-sensitive adhesive of claim 1, wherein the additional hydrocarbon compound is hydroxyl terminated 1,3-butadiene homopolymer.

30. The pressure-sensitive adhesive of claim 1, wherein the additional hydrocarbon compound is vinyl functional polybutadiene.

31. The pressure-sensitive adhesive of claim 1, wherein the additional hydrocarbon compound is hydroxyl terminated polybutadiene resin.

32. A pressure-sensitive adhesive composition comprising:
a hybrid acrylic-rubber copolymer having an acrylic backbone and a pendant macromer formed by reacting an acrylic monomer system comprising at least one alkyl acrylate ester containing from about 2 to about 20 carbon atoms in the alkyl group in the presence of a macromer selected from ethylene-butylene macromers, ethylene-propylene macromers, ethylene-butylene-propylene macromers, isobutylene macromers, and mixtures thereof, the copolymer including a continuous acrylic phase and a discontinuous hydrocarbon phase;
an additional hydrocarbon compound having a molecular weight of at least 1,000 and compatible with the macromer, the additional hydrocarbon compound is an oligomeric hydrocarbon or polymeric hydrocarbon or a combination of both,
wherein the macromer is present in an amount of from 5% to about 50% by weight of the acrylic monomer system and the macromer,
wherein the additional hydrocarbon comprises from about 5% to about 75% of the total weight of the pressure-sensitive adhesive composition, and
wherein the additional hydrocarbon compound comprises a material selected from the group consisting of hydrogenated liquid polyisoprene, methacrylic functionalized liquid isoprene rubber, maleic anhydride functionalized polypropylenes, carboxyl-terminated polybutadiene, epoxidized hydroxyl terminated polybutadiene resin, hydroxyl terminated polybutadiene resin, hydroxyl terminated 1,3-butadiene homopolymer, vinyl functional polybutadiene, and combinations thereof.

* * * * *